Nov. 27, 1962

C. E. SAUNDERS, JR

3,065,863

REMOTE CONTROL MANIPULATOR

Filed Jan. 13, 1961

INVENTOR.
CHARLES E. SAUNDERS JR.
BY
Arthur J. Plantamura
ATTORNEY.

INVENTOR.
CHARLES E. SAUNDERS JR.
BY
ATTORNEY.

Nov. 27, 1962 C. E. SAUNDERS, JR 3,065,863
REMOTE CONTROL MANIPULATOR
Filed Jan. 13, 1961 7 Sheets-Sheet 5

INVENTOR.
CHARLES E. SAUNDERS JR.
BY
ATTORNEY.

INVENTOR.
CHARLES E. SAUNDERS JR.
ATTORNEY.

Nov. 27, 1962 C. E. SAUNDERS, JR 3,065,863
REMOTE CONTROL MANIPULATOR
Filed Jan. 13, 1961
7 Sheets-Sheet 7

INVENTOR.
CHARLES E. SAUNDERS JR.
BY
Arthur J. Plantamura
ATTORNEY.

3,065,863
Patented Nov. 27, 1962

3,065,863
REMOTE CONTROL MANIPULATOR
Charles E. Saunders, Jr., Port Chester, N.Y., assignor to American Machine & Foundry Company, a corporation of New Jersey
Filed Jan. 13, 1961, Ser. No. 82,626
17 Claims. (Cl. 214—1)

This invention relates to mechanical manipulators or artificial arms which are employed for the purpose of manipulating articles at a position remote from the operator. In particular, the invention relates to improvements in manipulators of the type described in U.S. Patent 2,764,301.

In master-slave manipulator technology, heretofore, there has been no method of extending the slave end in a vertical plane without also correspondingly extending the master end. Consequently, an operator is confronted with considerable difficulties when he attempts to work at low levels since the operator must extend his hands to the same levels as the manipulator handles which he is grasping. In the extended position, the operator often times is not able to conveniently and comfortably see the graspers through the viewing window. Secondly, due to mounting height and operating height limitations of the mechanism, manipulators generally cannot reach the floor level. This has resulted in expensive schemes to counteract this, such as use of elevator-type hot cell floors, tables, special electronic equipment, etc.

The following invention solves both of the problems with the added advantage that there need be no change in tape lengths, over the arrangement of the type described in U.S. Patent 2,764,301, which means that the present invention need not present added problems due to tape stretch, deflection, etc.

In general, the essence of the invention lies in the ability of the slave arm to extend (with respect to the master arm) while the master arm is maintained in operating position at any level of extension. The arrangement of the present invention permits the manipulator to operate at any axial level of the slave arm relative to the master arm so that extension of the master arm in normal operation movements causes corresponding extension of the slave end.

According to my discovery, relative axial motion may be achieved by any arrangement that allows the wrist and tong tapes to slacken and takes up this slack in the complementary tape system of the arrangement. This result may be effected through the use of a system of pulleys located at any convenient position within the system which will enable movement of the pulleys to produce slack in the wrist pulleys. Actually this slack is absorbed in synchronism by the cable or tape connected to the counterweight system thereby maintaining tension in the flexible connecting cables.

In essence, the objects of the invention may be accomplished within the conventional system of U.S. Patent 2,764,301 by making presently fixed pulleys, which carry the flexible linking cables or tapes, movable. Alternately and preferably, as will be described in greater detail hereinbelow, an auxiliary pulley system upon which the linking tapes are mounted may be added to the conventional systems of that patent such that these additional pulleys are capable of movement relative to the master arm and in correspondence with the slave arm. The apparent slack in the flexible linking tapes or cables when the pulley bank is moved relative to the master arm permits the slave end to extend. The slack in the counterweight tapes which would appear to be produced by the shifting of the movable pulley is actually absorbed in a co-ordinate system, i.e. the tension in the integrated system is to the movement desired in the slave end so that the flexible linking means are retained continuously under tension. The system is operated in synchronism, so that when the appropriate pulleys are moved the complementary pulley arrangement is moved correspondingly in response. The system essentially affords a greater extension of the slave arm from its pivot relative to the extension capabilities of the master arm.

In utilizing a movable pulley unit situated on the master arm assembly, the effect of the arrangement provided by the invention is such that when the pulley bank is raised axially a distance X in the master arm, for example, the effective tape length linking the slave arm (and the lower portion of the slave arm itself) is extended a distance 2X. The extension of the slave arm beyond the limits of prior art structures is accomplished by suitable arrangement such as by the use of a secondary telescoping movable member, in lieu of the prior art relatively stationary part of the slave arm, in combination with a cylindrical auxiliary guide to house the secondary telescopic member. By attaching suitable lower slave end counterweight pulleys to this secondary telescoping member, the tape length in the assembly is unchanged.

It is an object of the present invention to provide an improved remote control manipulator in which the reach of axial extension of the slave arm is significantly extended without detracting from the normal corresponding operations of master and slave arms.

It is a further object of the invention to provide a manipulator that permits axial extension of the slave arm relative to the master arm.

Additionally, it is an object of the invention to provide a remote control manipulator of greater versatility without the necessity of changing the tape lengths linking the master and slave arms.

Additional advantages and features of the invention will become apparent from the specification and drawings.

Figure 1:
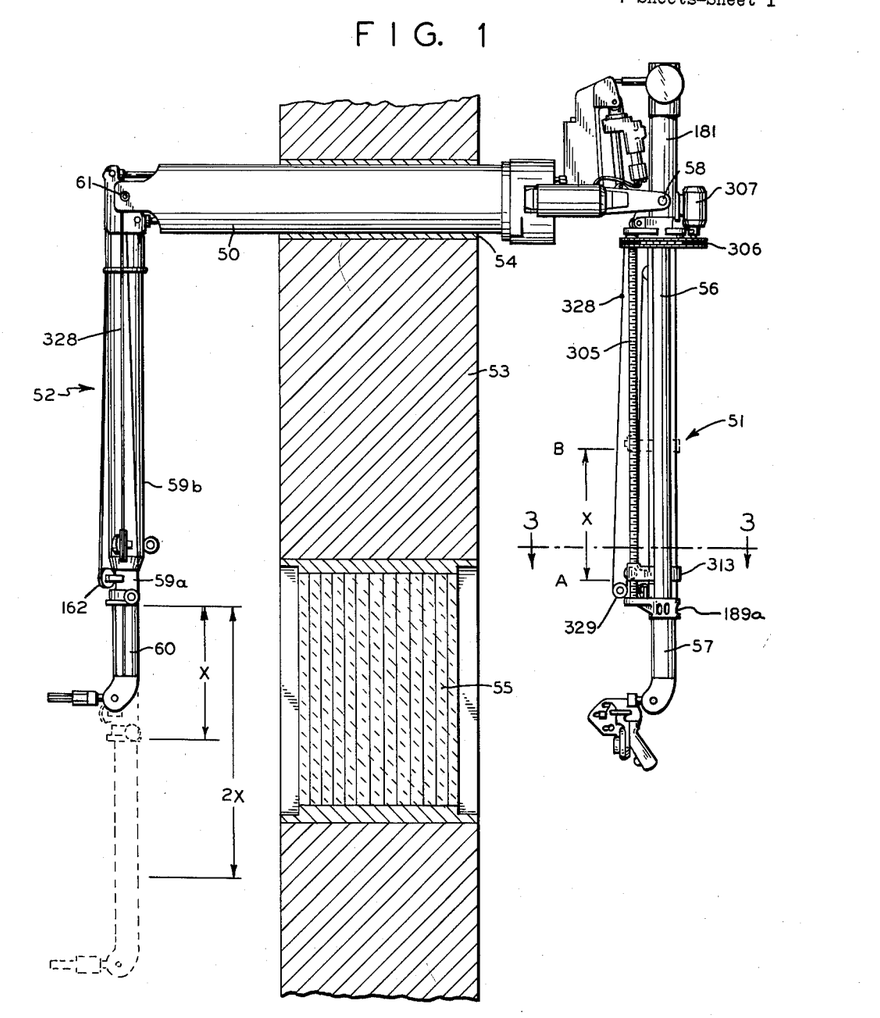
FIG. 1 is an elevational view partially in section showing one embodiment of the improved manipulator mounted in a shielding wall and illustrating the master and slave arm in a corresponding position and by broken lines a relative extended position of the slave arm.

In FIG. 1 of the drawings, the same general arrangement as that shown in FIG. 1 of U.S. Patent 2,764,301 is employed with like numerals in general indicating like parts for the purpose of facilitating the description of the invention in the light of the prior art arrangement represented by that patent. Where parts have been modified from those shown by the patent, the numerals are likewise modified by referencing with small letters of the alphabet in conjunction with that numeral. Different numerals are utilized for parts differing from those of the patent. In referring to "conventional design" or "prior art" herein, the structure of the manipulator represented by Patent 2,764,301 is generally contemplated.

As shown in FIG. 1 of the drawing, the manipulator of the invention comprises a horizontal support 50, master arm 51 and a slave arm 52. A conventional horizontal support 50 is mounted on a sleeve or tube 54 set in a shielding wall 53. Provided in the wall is a conventionally arranged viewing window 55. The master arm 51 comprises a relatively stationary part 56 pivotally connected at 58 to the horizontal support 50 and a movable part 57. The movable part 57 is mounted on the stationary part 56 so as to slide in a longitudinal extensible direction with respect to part 56 and toward and away from the pivot 58. The slave arm 52 in the conventional design as shown in the patent comprises a relatively stationary part 59, closer to the pivot, and a movable part 60. The slave arm 52 according to the invention may be modified where extension beyond the limits of the master arm is desired so that in lieu of the relatively stationary part 59, a two part structure is employed which comprises a movable part 59a (with respect to the pivot 61) and a relatively stationary part 59b. The movable part 60 is mounted on the movable part 59a and in turn 59a is mounted in the stationary auxiliary tube guide member 59b so as to be slideable therealong toward and away from the pivot 61. In essence, the structure of the slave arm shown differs over that shown in the above-mentioned patent by an arrangement in which the relatively stationary part 59 of the patent has been severed from the section of the slave arm which connects the upper part of the arm to the horizontal support and designated 59a. The member 59a is movable relative to ber 59b which is fixed with respect to the pivot 61 has the pivot 61 for the arm. An auxiliary guide tube member been provided over this severed part 59a in telescopic arrangement. It will be apparent that other conventional arrangements may likewise be employed to effect this relative movement of these parts without departing from the spirit of the invention. It should also be noted that a secondary telescopic member 59b is not essential to produce relative motion. This method allows additional extension of the slave arm beyond the stroke possible through normal corresponding motion of the master and slave arm of conventional design. However, relative axial extension up to the normal corresponding extension can be achieved by any method wherein the flexible linking tapes are slackened, the slave arm is extended, and the counterweights operating in synchronism are employed to restore tension in the tapes.

In accordance with the invention, and as illustrated in FIGS. 1–7, the pulleys 207 are designed to move in a coaxial direction with respect to the master arm rather than being in fixed relationship therewith as in conventional design. The movable pulleys 207 are conveniently arranged to ride as a unit on the drive screw 305 as the screw rotates. Any suitable means such as a chain and sprocket arrangement 306 driven by appropriate means, such as manual crank or motor 307 may be employed to turn the drive screw. When the drive screw is operated so that the pulley unit 207 on the master arm is moved from point A to point B showing the unit in dotted lines, for a distance of X, the movement of the slave member 60 is extended the same distance with respect to member 59a. Additionally, the movable member 59a extends the same distance to give a total extension of the slave member 60 totalling twice the distance of the pulley movement on the master arm.

Figure 2:
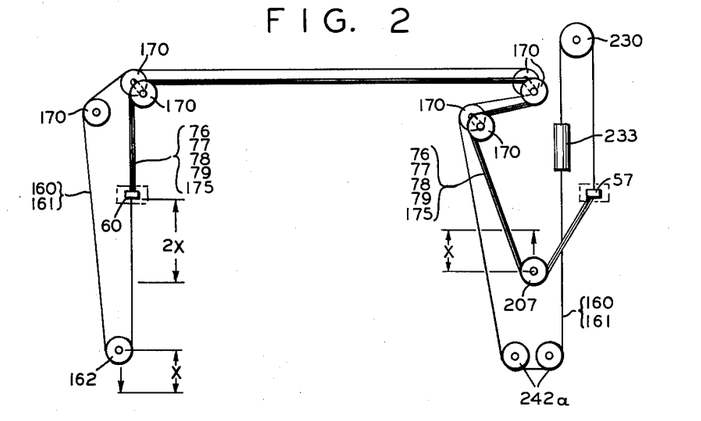
FIG. 2 is a composite diagrammatic view illustrating the flexible linking cable system of prior art design in inter-relationship and indicating by arrows how the movement of the slave arm would be extended and retracted in correspondence with a movable pulley support and relative to the master arm.
Figure 2A:
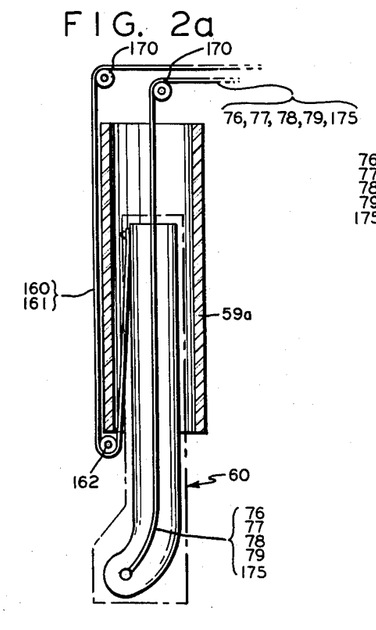
FIG. 2a illustrates in greater detail the portion of the slave arm shown as point 60 in FIG. 2 and its relationship to the slave arm assembly.
Figure 2B:
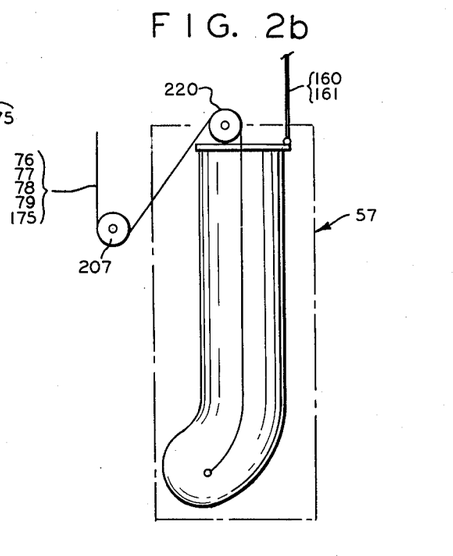
FIG. 2b illustrates in greater detail the portion of the master arm shown as point 57 in FIG. 2.

The operability of the improved manipulator of the invention is explained in greater detail by reference to FIG. 2 which is an abbreviated diagrammatical view. Linking cables or tapes 79, 78, 175, 77, 76 are illustrated as a unit insofar as the novel features of the invention are concerned. It will be apparent, however, as shown in U.S. Patent 2,764,301 these tapes operate independently and/or conjointly in reproducing the various manipulations of the wrist and grasper. The arrangement of FIG. 2 represents essentially the system disclosed in U.S. Patent 2,-764,301 with the exception of the movable feature of the pulleys relative to the master arm to which the invention is directed. Thus in FIG. 2, pulleys 162, 170, 207, 230 and 242a as well as counterweight 233 perform the same function as noted in the patent with the exception herein noted. Pulleys 242a distinguish over the patent only in that two pulleys 242a replace each of the pulleys 242 of the patent for substantially the same function. It is seen that if the pulleys 207, which are fixed in the conventional system, are made movable and are moved upward, the tapes 79, 78, 175, 77 and 76 connected thereto and holding the master arm boom tube 57 stationary, permit movement of the slave arm boom tube 60 downward. The effect of raising pulleys 207 is to slacken tapes 79, 78, 175, 77 and 76. To maintain tension, pulley 162 affixed to the slave arm 59a is moved downward a distance corresponding to the upward movement of pulley 207. As noted hereinbefore, the total effect of moving pulley bank 207 upward a distance X results in a downward movement of the lower part of the slave arm 60 a distance 2X with respect to the slave arm pivot point. This is effected as noted more clearly in FIG. 1 by movement of the slave boom 60 a distance 2X. To take up slack, the pulleys 162 affixed to the secondary telescopic member 59a are moved a distance X.

It is seen that by moving 59a together with the pulleys 162, a distance X corresponding extension of master and and slave arms equal to the total normal stroke of slave boom 60 minus the distance X is available for further extension. When X equals the total normal extension available, the slave boom 60 is extended twice the normal stroke.

In a system where a secondary telescopic member is not employed movements of pulleys 162 (or other pulleys that perform the similar function of maintaining tension in the linking means) may still be employed to effect movement of the slave boom 60 a distance 2X. However, the maximum extension is limited by the normal stroke.

Figure 3:
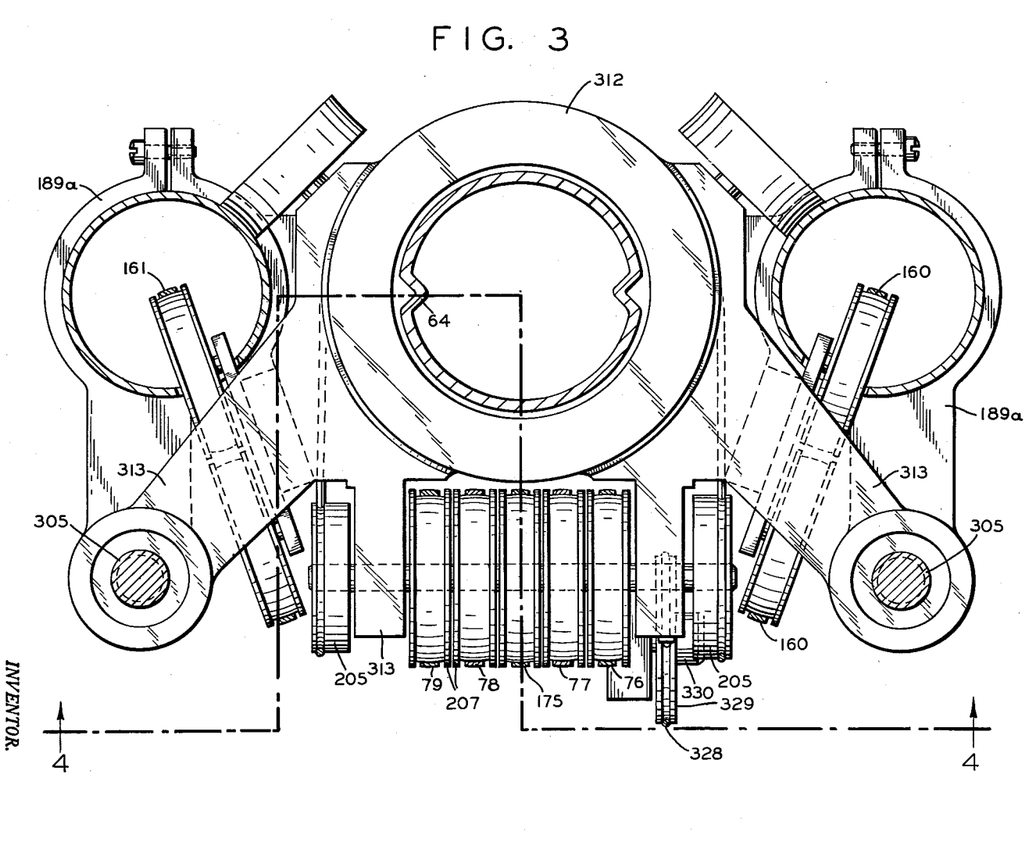
FIG. 3 is a horizontal sectional view of the movable pulley arrangement mounted on the master arm taken in a downward direction on the line 3—3 of FIG. 1 rotated counterclockwise 90 degrees.
Figure 4:
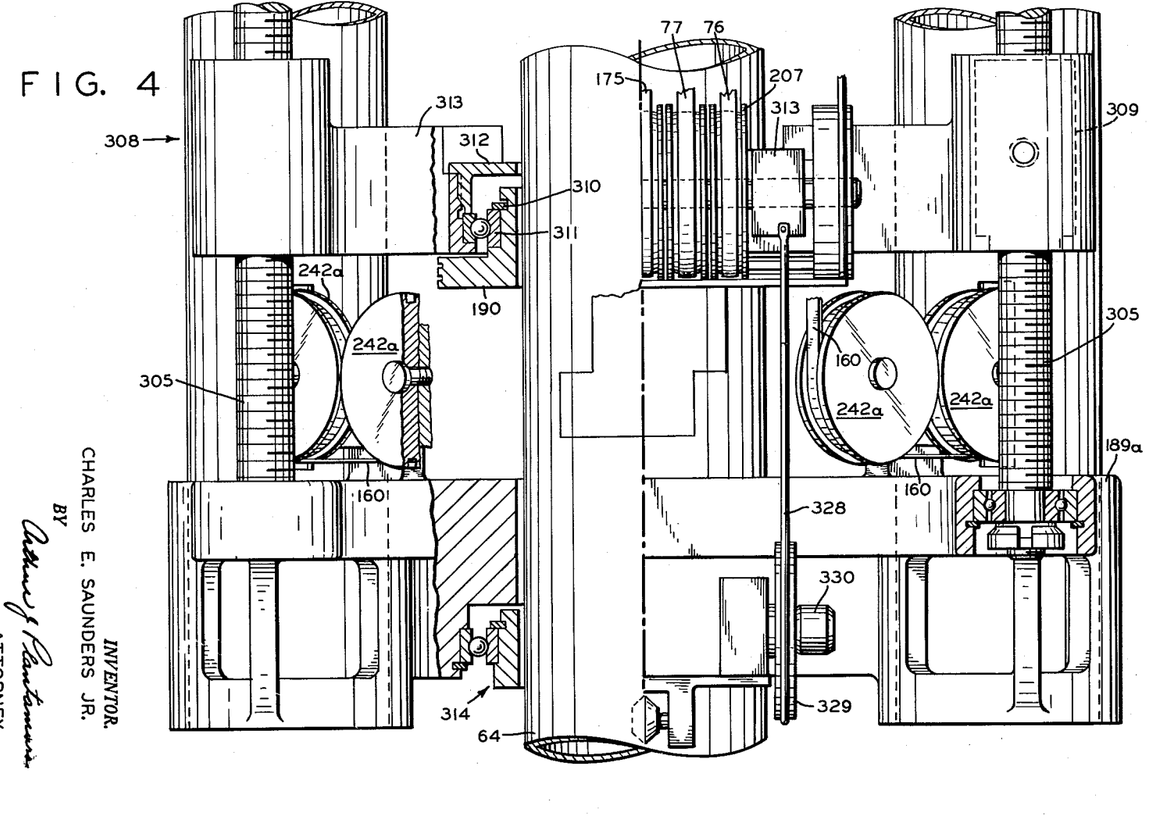
FIG. 4 is a vertical sectional view taken along the lines 4—4 of FIG. 3.

A suitable arrangement for making pulley unit containing pulleys 207 and 205 movable together with azimuth drum assembly 190 situated on the master arm to effect extension of the slave arm substantially beyond the limits of the master arm is illustrated in FIG. 3 and FIG. 4. This is accomplished by making a separate subassembly 308 of these parts and attaching this sub-assembly to the nut 309 of two antifriction bearing screws 305. The movable assembly 308 comprises azimuth drum 190, a snap ring 310, bearing 311, a bearing retainer 312 and the movable pulley bank support unit 313. Boom member 64 serves the same function as the corresponding numbered member in U.S. Patent 2,764,301. In making assembly 308 movable and detaching from fixed member 189a, an additional guide assembly 314 is employed to guide the boom tube 64 when the movable assembly 308 is in the upper position.

The screw 305 is bearing mounted on the stationary portion 189a of the master arm 56 at the bottom and to the master pivot frame casting 181 at the top (see FIG. 1). As noted hereinabove, the ball screw 305 is chain driven by sprockets mounted to the screw at the upper end and the chain is driven by the motor 307 mounted on the reverse side of casting 181.

Figure 5:
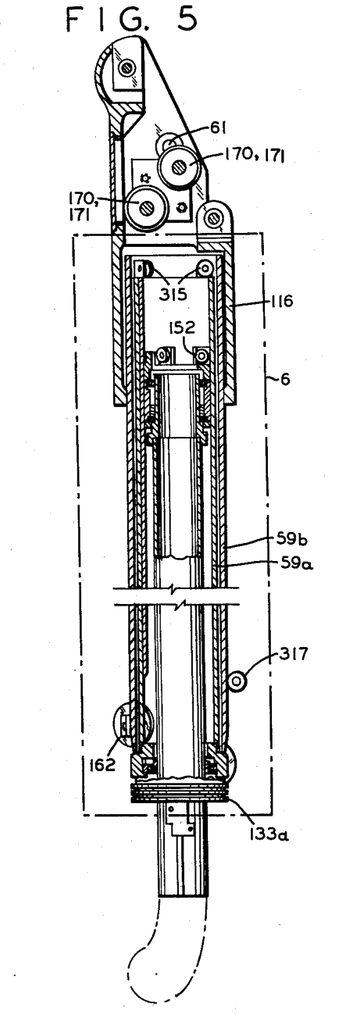
FIG. 5 is an elevational sectional view of the slave arm illustrating the relationship of the secondary telescopic member and auxiliary guide tube.
Figure 6:
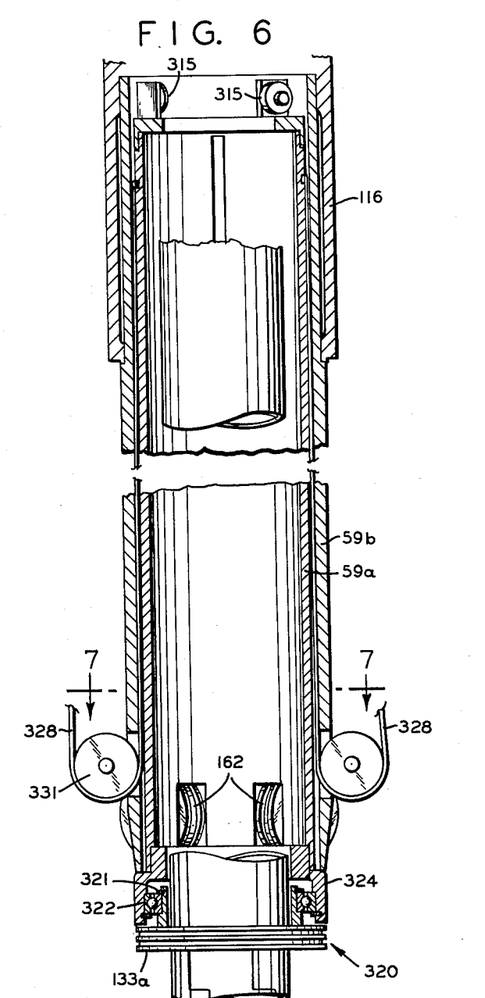
FIG. 6 is an enlarged vertical sectional view of the slave arm substantially encompassing the area 6 of FIG. 5 rotated clockwise 90 degrees.
Figure 7:
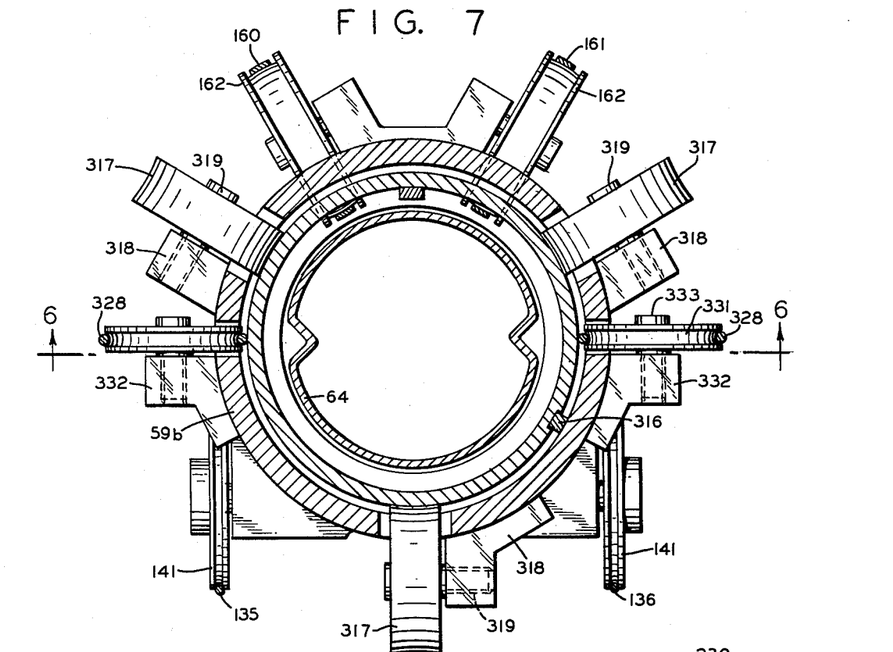
FIG. 7 is a horizontal sectional view taken along the line 7—7 of FIG. 6.

Operation of the motor rotates the screws, driving the nut assembly 309 up and carrying assembly 303 containing pulleys 207 and 205 as well as the azimuth drum assembly 190 upward. Motion of these pulleys slackens cables 79, 78, 175, 77 and 76 and allows the slave tube assembly 60 to extend (FIG. 2). Extension of the tube 60 slackens counterweight cables 160 and 161, FIG. 7. Referring to FIGS. 5, 6 and 7, this slack in the cables is taken up by allowing the movable trunk tube 59a and attached pulleys 162 to lower a corresponding distance. The movement of member 59a as described hereinabove is effected by disconnecting the trunk tube 59a from slave pivot frame 116 (as in the conventional design of U.S. Patent 2,764,301) and mounting it inside the auxiliary sleeve guide member 59b. Roller assemblies 315 affixed to the secondary telescopic member 59a provide bearing for the vertical motion similar to rollers 152 described in the above patent. The tube 59a is keyed to 59b by key 316 (FIG. 7) to prevent rotation. Tube 59b is attached to slave pivot frame 116. Three additional rollers 317 are suitably mounted as on brackets 318 preferably by means of eccentric shafts 319 to permit adjustment and allow centering of the tube 59a at the lower end of the auxiliary tube 59b. These rollers provide guidance for the secondary telescopic member 59a.

The slave azimuth assembly 320 comprising azimuth ring 133a, a snap ring 321 bearing 322 and housing 324 is fastened to movable telescopic member 59a. This assembly moves a distance corresponding to the distance X moved by the azimuth assembly in the master end to maintain tension in azimuth cables 135 and 136 mounted on pulleys 141 on the slave side and 205 on the master side.

When the invention is employed in conjunction with a secondary telescopic member 59a, an auxiliary system is required to maintain tension in the flexible linking tapes. In the system of U.S. Patent 2,764,301, this tension is maintained by relatively stationary member 59 which is attached to slave pivot frame 116. According to the invention, for the purpose of maintaining tension, cables 328 (see FIG. 1) are attached to the movable azimuth assembly 313 and drawn around a pulley 329 which it attached to the stationary portion 189a of the master arm by the fastener 330. The cables 328 extend upward and around pulleys (not shown) adjacent to and similar to 171 of the patent and mounted on the same shaft as pulleys 170. At the slave end cables 328 (FIG. 6) are drawn down and around pulley 331 affixed to a bracket 332 by a fastener 333 (FIG. 7). The bracket 332 is attached to the relatively stationary member 59b. The cable 328 drawn around pulley 331 passes thorugh a space intermediate between tube 59a and 59b and is attached at the upper end of 59a. By this arrangement, it is apparent that the upward movement of the azimuth pulley assembly 313 (which contains pulley 207) causes a corresponding downward movement of member 59a (which contains pulley assembly 162) thereby maintaining tension in the linking means 79, 78, 175, 77, 76, 160 and 161 and causing slave boom tube 60 to move downward.

Other systems will become obvious to those skilled in the art for accomplishing the same object. For example, in lieu of the auxiliary cable system described, a separately driven rack and pinion may be employed where the pinion is connected to the relatively stationary member 59b and the rack is connected to the movable member 59a and the pinion is driven by a suitable system, such as a separate drive or a linking to the main drive system to produce such motion of the movable members as to maintain tension in the system.

Figures 9, 10:
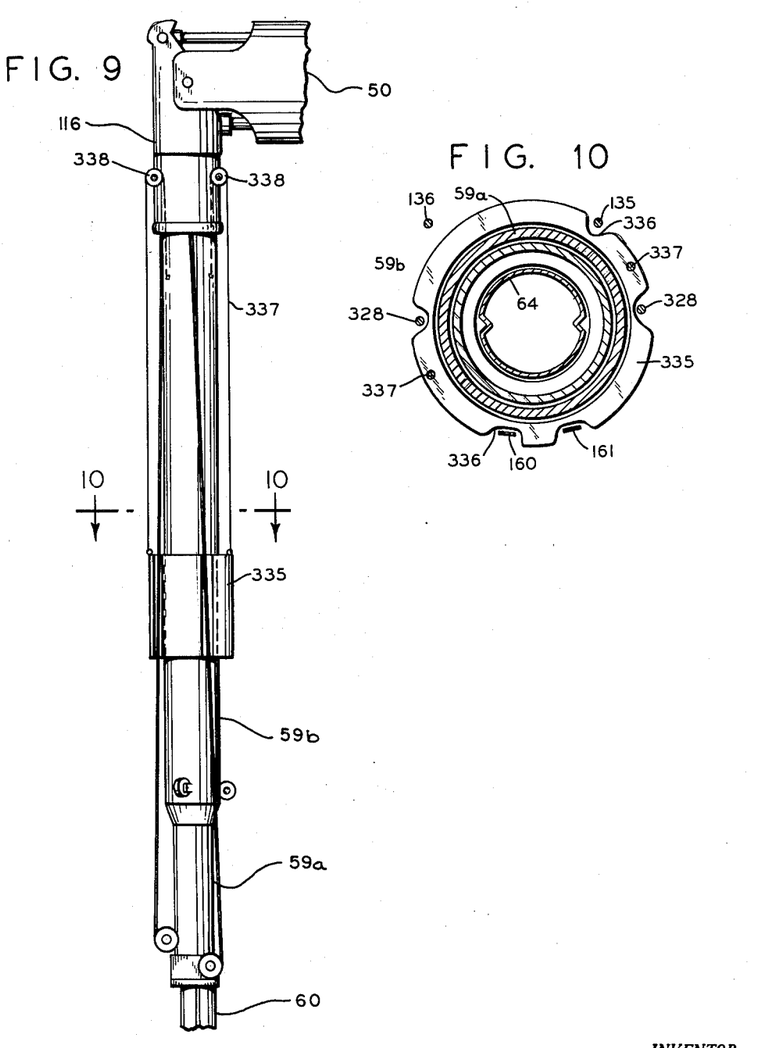
FIG. 9 is an elevational view of the slave arm illustrating a suitable counterbalancing system for the imbalance caused by the relative axial extension of the arms.
FIG. 10 is a horizontal cross-sectional view taken along line 10—10 at FIG. 9.

In order to retain balance in the manipulator in the plane vertically parallel and in the plane toward and away from the wall, additional counter-balancing is preferably employed. This unbalance is caused by the increased lever arms resulting from the axial extension of parts 59a and 60 beyond the limits of conventional manipulators. A suitable means for maintaining balance is described in conjunction with FIG. 9 and FIG. 10. For this purpose an annular counterweight 335 with suitable cutouts 336 for the cables and tapes mounted exterior to the slave arm 52 is employed. The weight 335 is suspended from cables 337 to which the weight is attached. The suspending cables 337 are drawn around pulleys 338 which are attached to slave pivot frame 116. The cables 337 passing around the pulleys 338 are attached to the upper end of movable telescopic member 59a. In contracted position of the slave arm, the weight 335 is located in the lower position of 59b. As the secondary telescopic member 59a extends a distance X, the weight 335 is moved upward a distance X. In general, the weight 335 should approximately equal twice the weight of the slave boom tube 60 plus the weight of the telescopic member 59a. It will be apparent that for an increase in lever arm of the secondary telescopic member 59a a distance X and an increase in the slave boom 60 a distance 2X, the counterweight 335 will move upward a distance X and maintain the requisite balance.

Figure 8:
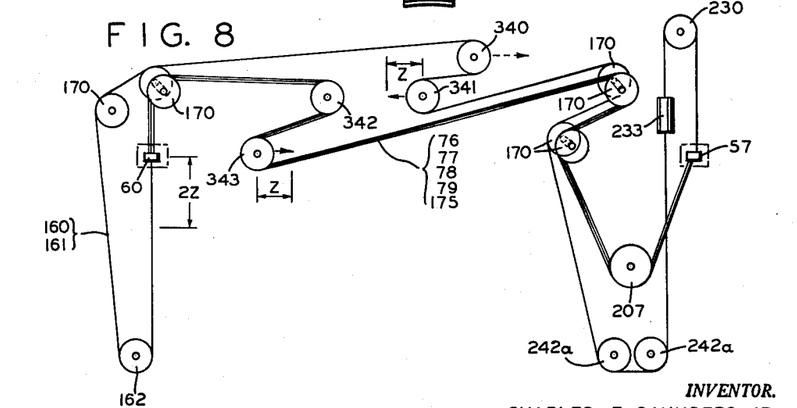
FIG. 8 is a composite diagrammatic view arrangement illustrating an alternate movable pulley system mounted in a horizontal plane.

In the alternate embodiment illustrated in FIG. 8, in which the movable pulleys are mounted on the horizontal support, the linking means and pulleys function substantially as those in FIG. 2 with the exception that pulley 207 and 162 are fixed as in the disclosure of U.S. Patent 2,764,301. The relative extension of the slave arm to master arm is effected by an additional loop comprising auxiliary pulleys 340, 341, 342, 343. The arrangement is illustrated in the horizontal plane but a like system of auxiliary pulleys may be positioned at any suitable location in the system. Linking means 79, 78, 175, 77, 76 are mounted on pulley 343, 342, and the complementary linking means 160 and 161 are mounted on pulleys 340 and 341. In this embodiment when it is desired to extend the slave arm relative to the master arm, pulley 343 is moved by suitable means as by a jack screw (not shown) in the direction of the arrow causing a slackening of tapes 79, 78, 175, 77, 76 and pulley 341 is moved in the opposite direction as shown by the arrow. This may be effected by mounting these pulleys on the same jack screw having oppositely directed thread. Instead of moving pulley 341 in the opposite direction, pulley 340 may be moved a distance, as shown by the dotted arrow, equal to and in the same direction as pulley 343. It is apparent that the movement of pulley 343, a distance Z, with the master end held stationary, will result in a slackening of the linking means 79, 78, 175, 77, 76 allowing the slave end to extend relative to the master end a distance 2Z. Motion of pulley 341 in the direction of the arrow a distance Z will draw up the linking means 160 and 161 restoring tension in the system and causing slave boom tube 60 to move downward. Alternately, the appropriate movement of any combination of pulleys 340, 341, 342 and 343 may be employed to effect the desired result.

In addition to a flexible linking cable system under tension in combination with pulleys, an alternate system comprising storage drums and clutch arrangement intermediately positioned at a suitable location in the linking means may be utilized. Drum and clutch mechanisms of this type are commercially available. In a system of this type, the slave arm and master arm linking tape storage drums are engaged through the clutch for corresponding movement. When relative axial extension or retraction of the arms is desired the drums are disengaged through the clutch until the desired length of flexible linking tape is either wound or unwound with corresponding winding or unwinding in the complementary drum to take up the slack. Thereafter the two drums are again connected to effect corresponding movement of the master and slave arm in the conventional manner.

It will be apparent that the exemplary forms of the invention described hereinabove in conjunction with the accompanying drawings are illustrative only. The essence of the invention resides in the use of an arrangement to permit extension and retraction, preferably through the linking means, of the slave arm with respect to the master arm. The arrangement being co-ordinated so that a complementary system maintains tension in the linking means to provide a manipulator of greatly expanded utility.

In addition to the various means described above, it will be apparent that one skilled in the art based on the inventive teaching herein provided may employ still other means of employing the invention without departing from the scope of the present discovery. To accomplish this purpose, a variety of known alternate mechanisms may be employed in lieu of or in addition to movable pulleys or linking tape storage drum and clutch combinations, such as rack and pinions, gearing arrangements, servo systems, and the like.

Accordingly, it will be understood that the invention is not to be limited except as required by the appended claims.

I claim:

1. In a remote control manipulator comprising a horizontal support, a master arm, an extensible portion on said master arm, a slave arm, an extensible portion on said slave arm, said arms connected to the respective ends of said support for pivotal movement with respect to the support and linking means connecting said extensible portions to provide coordinate axial movement in said portions, the improvement which comprises means, operable through said linking means connecting said extensible portions, for causing relative axial extension and retraction of the extensible portion of one arm with respect to the extensible portion of the other arm and means coordinated with said extension and retraction means for maintaining tension in said linking means.

2. In a remote control manipulator comprising a horizontal tubular support, a master arm, an extensible portion on said master arm, a slave arm, an extensible portion on said slave arms, said arms connected to the respective ends of said support for pivotal movement with respect to the support and linking means connecting said extensible portions to provide coordinate axial movement in said portions, the improvement which comprises means for causing relative axial extension of the extensible portion of the slave arm with respect to the extensible portion of the master arm, said means including pulleys for mounting said linking means thereon, a movable support for said pulleys, said support being movable with respect to the mount of said support, means for movement of said support and pulleys to allow said linking means and the slave arm to extend relative to the master arm, and complementary means to maintain tension in said linking means.

3. In a remote control manipulator comprising a horizontal tubular support, a master arm, an extensible portion on said master arm, a slave arm comprising an upper section, intermediate extensible section, and an extensible portion in said intermediate section, said master and slave arms connected to the respective ends of said support for pivotal movement with respect to the support and linking means connecting said extensible portions to provide coordinate axial movement in said portions, the improvement effecting relative axial extension of the extensible portion of the slave arm with respect to the extensible portion of the master arm which comprises a pulley support, linking-tape carrying pulleys mounted on said pulley support, master and slave arm flexible linking tape mounted on said pulleys, said pulley support being mounted on said master arm and being movable with respect to the master arm and the slave arm, means for movement of said pulley support, and means for axial movement of the intermediate section of the slave arm responsive to the movement of said movable pulley support to maintain tension in said linking tape.

4. The remote control manipulator of Claim 2 in which said pulley support, movable with respect to the master arm, and linking tape carrying pulleys mounted on said support, are mounted on the horizontal support and are movable in a horizontal direction with the linking means mounted thereon.

5. The remote control manipulator of claim 3 in which said pulley support is mounted on the master arm and movable in an axial direction with respect to said master arm.

6. In a remote control manipulator comprising a horizontal tubular support, a master arm, an extensible portion on said master arm, a slave arm, an extensible portion on said slave arm, said arms connected to the respective ends of said support for pivotal movement with respect to the support and linking means connecting said extensible portions to provide coordinate axial movement in said portions, the improvement which comprises means for causing relative axial extension of the extensible portion of one arm with respect to the extensible portion of the other arm, means permitting a displacement of the linking means to allow extension and retraction of the extensible portion of the slave arm with respect to the pivot of the slave arm and with respect to the master arm and means, complementary to said means for permitting displacement of the linking means to the slave arm, to maintain tension in said linking means.

7. In a remote control manipulator comprising a horizontal tubular support, a master arm, an extensible portion on said master arm, a slave arm, an extensible portion on said slave arm, said arms, connected to the respective ends of said support for pivotal movement with respect to the support and linking means connecting said extensible portions to provide coordinate axial movement in said portions, the improvement permitting axial extension of the extensible portion of the slave arm with respect to the extensible portion of the master arm which comprises a movable pulley support on the master arm, linking means carrying pulleys mounted on said support, master and slave arm linking means mounted on said pulleys, said pulley support being axially movable with respect to the master arm, means for movement of said pulley support in an axial direction with respect to said master arm and means for axial movement of said extensible portion of the slave arm through the linking means and responsive to the movement of said movable pulley support, to maintain tension in said linking means.

8. In a remote control manipulator comprising a horizontal tubular support, a master arm, an extensible portion on said master arm, a slave arm, an extensible portion on said slave arm, said arms connected to the respective ends of said support for pivotal movement with respect to the support and linking means connecting said extensible portions to provide coordinate axial movement in said portions, the improvement permitting axial extension and retraction of the slave arm with respect to the extensible portion of the master arm which comprises a pulley support movable with respect to the master arm mounted on the master arm, pulleys for carrying the master and slave arm linking means mounted on said support, master and slave arm linking means mounted on said pulleys, said pulley support being axially movable with respect to the master arm, means for movement of said pulley support in an axial direction with respect to said master arm and means for axial movement of said slave arm through the linking means and responsive to the movement of said movable pulley support to maintain tension in said linking means.

9. The remote control manipulator of claim 8 in which the movable pulley support is mounted on a movable bracket and actuated by riding on a bearing screw and means for actuating said bearing screw.

10. The remote control manipulator of claim 8 in which the movable pulley support is mounted on a movable bracket attached to the master arm said bracket mounted on bearing screw connected to a sprocket and means for actuating said sprocket to move said bracket in a vertical direction by said bearing screw.

11. In a remote control manipulator comprising a horizontal tubular support, a master arm, an extensible portion on said master arm, a slave arm, an extensible portion on said slave arm, said arms connected to the respective ends of said support for pivotal movement with respect to the support and linking means connecting said extensible portions to provide coordinate axial movement in said portions, the improvement which comprises means for causing relative axial extension of the extensible portion of the slave arm with respect to the extensible portion of the master arm, said means including master and slave arm flexible linking means, pulleys for mounting said linking means thereon, a mount for said pulleys, said pulleys and mount therefor being movable axially with respect to the support of said mounts, means for movement of said mount to allow said linking means to slacken and the slave arm to lower, complementary means to maintain tension in said linking means and a counterweight to offset the imbalance in the manipulator effected by the extension of the slave arm beyond a corresponding extension of the master arm.

12. In a remote control manipulator comprising a horizontal tubular support, a master arm, an extensible portion on said master arm, a slave arm, an extensible portion on said slave arm, said arms connected to the respective ends of said support for pivotal movement with respect to the support and linking means connecting said extensible portions to provide coordinate axial movement in said portions, the improvement effecting relative axial extension of the extensible portion of the slave arm with respect to the extensible portion of the master arm which comprises a pulley support mounted on, and movable with respect to, the master arm, pulleys mounted on said support, master and slave arm linking tapes mounted on said pulleys, means for movement of said pulleys effecting axial movement in the slave arm through the linking tapes, and means responsive to the movement of said movable pulleys to maintain tension in said linking tapes.

13. The manipulator of claim 12 in which the slave arm comprises with respect to the pivot of said arm, a non-extensible upper arm member, an intermediate extensible arm member and a lower extensible arm member said lower member being also extensible with respect to said intermediate member.

14. The manipulator of claim 12 in which the means maintaining tension is fixed to the intermediate arm member.

15. In a remote control manipulator comprising a horizontal support, a master arm, an extensible portion on said master arm, a slave arm, an extensible portion on said slave arm, said arms connected to the respective ends of said support and linking means connecting said extensible portions to provide coordinate extension in said portions, the improvement which comprises first means, operable through said linking means connecting said extensible portions, for causing relative extension and retraction axially of the extensible portion of one arm with respect to the extensible portion of the other arm and second means coordinated with said first means for maintaining tension in said linking means.

16. A remote control manipulator comprising a horizontal support, a master arm, an extensible portion on said master arm, a slave arm, an extensible portion on said slave arm, said arms connected to the respective ends of said support, linking means connecting said extensible portions to provide coordinate extension in said portions, a movable pulley support and pulleys carried thereby for guiding said linking means and for causing relative extension and retraction axially of the extensible portion of one arm with respect to the extensible portion of the other arm, and second means coordinated with said first means for maintaining tension in said linking means.

17. In a remote control manipulator comprising a horizontal support, a master arm, a slave arm, an extensible portion on said slave arm, said arms connected to the respective ends of said support and linking means connecting said extensible portions and said master arm to provide coordinate extension, the improvement which comprises first means, operable through said linking means connecting said extensible portions, for causing relative axial extension and retraction of the extensible portion of the slave arm with respect to the master arm and second means coordinated with said first means for maintaining tension in said linking means.

References Cited in the file of this patent

UNITED STATES PATENTS 2,764,301    Goertz et al. ___________ Sept. 25, 1956

UNITED STATES PATENT OFFICE
CERTIFICATE OF CORRECTION

Patent No. 3,065,863                                      November 27, 1962

Charles E. Saunders, Jr.

It is hereby certified that error appears in the above numbered patent requiring correction and that the said Letters Patent should read as corrected below.

Column 1, line 72, after "system is" insert -- maintained by making the counterweight pulleys responsive --; column 2, line 11, for "thaa" read -- that --; column 3, lines 48 and 49, for "ber 59b which is fixed with respect to the pivot 61 has the pivot 61 for the arm. An auxiliary guide tube mem-" read -- the pivot 61 for the arm. An auxiliary guide tube member 59b which is fixed with respect to the pivot 61 has --;

Signed and sealed this 25th day of June 1963.

(SEAL)
Attest:

ERNEST W. SWIDER                                    DAVID L. LADD
Attesting Officer                                        Commissioner of Patents